United States Patent [19]
Klingman, III

[11] 3,938,892
[45] Feb. 17, 1976

[54] ELECTRONIC OPTICAL TRANSFER FUNCTION ANALYZER

[75] Inventor: Edwin E. Klingman, III, Huntsville, Ala.

[73] Assignee: The United States of America as represented by the United States National Aeronautics and Space Administration, Washington, D.C.

[22] Filed: Apr. 24, 1973

[21] Appl. No.: 354,060

[52] U.S. Cl.................................. 356/124; 356/123
[51] Int. Cl.$^2$........................ G01B 9/00; G01J 1/00
[58] Field of Search .......... 356/124, 106, 125, 126, 356/127, 123

[56] References Cited
UNITED STATES PATENTS

| | | | |
|---|---|---|---|
| 2,773,413 | 12/1956 | Schade, Sr. | 356/124 |
| 3,519,358 | 7/1970 | Kuttner | 356/124 |
| 3,563,657 | 2/1971 | Kinseley et al. | 356/83 |
| 3,694,088 | 9/1972 | Gallagher et al. | 356/106 |

Primary Examiner—Alfred E. Smith
Assistant Examiner—Conrad J. Clark
Attorney, Agent, or Firm—George J. Porter; L. D. Wofford, Jr.; John R. Manning

[57] ABSTRACT

An electronic optical analyzer for use in systems such as optical transfer function analyzers eliminates mechanical scanning systems and comprises entirely electronic image dissection means for dissecting an image transmitted by an optical system under test and producing an electric output signal representative of the beam intensity at a selected element of the image. The image dissection means is preferably (in the case of visible light) an image dissector tube whose positioning coils serve as an image element addressing means. The system is useable with any optical system including visible light, other electromagnetic radiation or charged particles (ions or electrons) so long as the image dissection means is responsive to the beam in question. The optical system under test must produce a real image at the image dissection surface of the image dissection means in order for readily evaluatable data to be obtained. The entire system is preferably computer controlled in order to obtain the necessary data quickly and accurately and to calculate the optical transfer function of the optical system under test on line. With this system both the modulation transfer function and the phase transfer function may be calculated. The digital computer can control the analyzer in any of several modes such as single scan, multiple scan with averaging of values to improve the signal to noise ratio and pass/fail production testing. output from the computer can be in any of several forms, such as displays on display devices, printouts or process control commands such as accept/reject commands in production testing.

12 Claims, 2 Drawing Figures

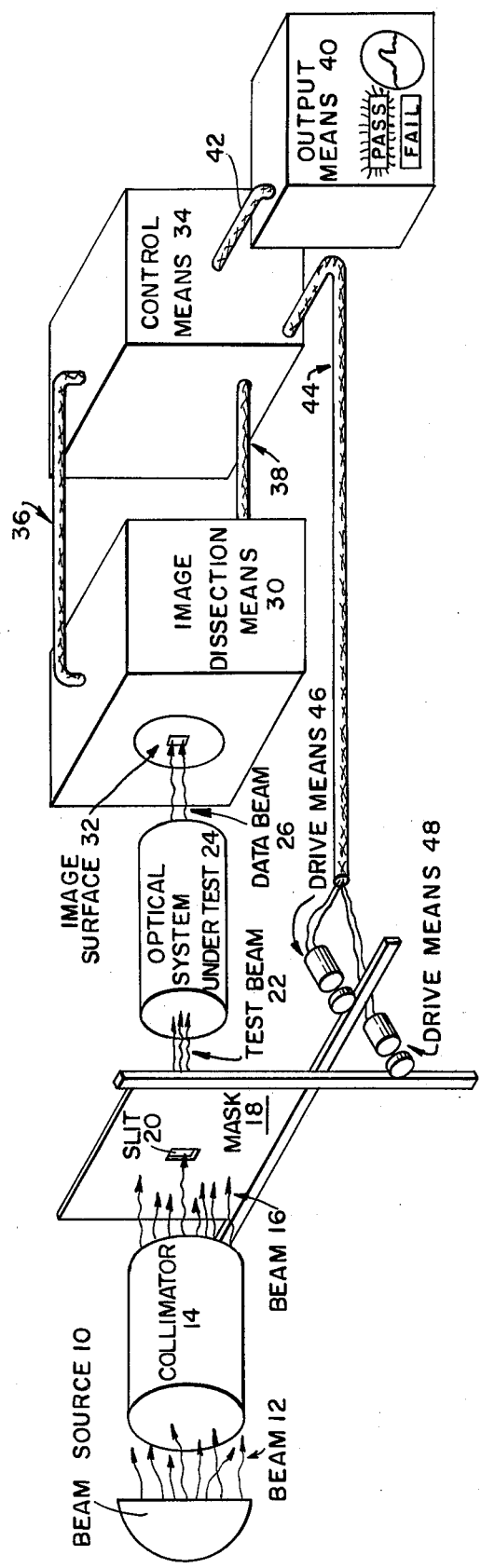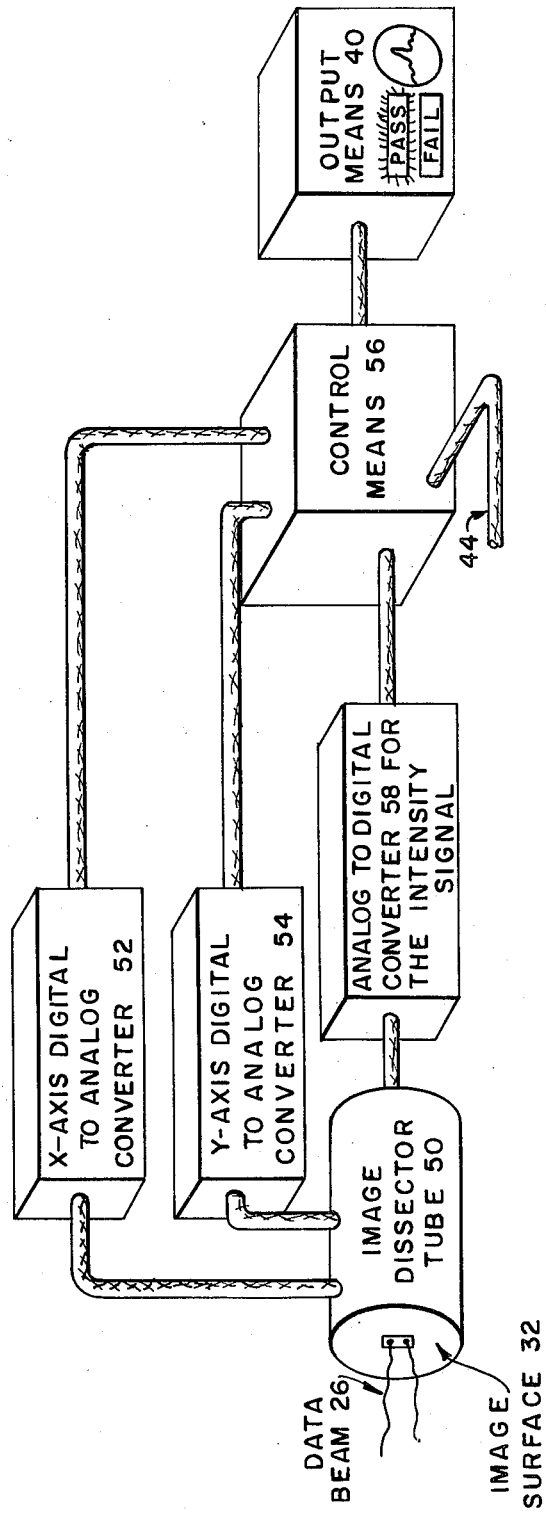

ELECTRONIC OPTICAL TRANSFER FUNCTION ANALYZER

BACKGROUND OF THE INVENTION

1. Field of the Invention

The invention pertains to the field of optical transfer function analyzers.

An optical transfer function analyzer is a device for quantizing the resolving quality of an optical system. The optical transfer function analyzer measures the light scattered out of a bright beam into an area which should be unlighted. If $E(x)$ is the illumination on an image surface of the analyzer as a function of position $x$, then the optical transfer function is found by taking the fourier sine-cosine transform pair of the derivative of $E(x)$. The value of $E$ is measured for successive positions until the data necessary for calculating the optical transfer function of the system being tested has been obtained.

2. Prior Art

Prior art optical transfer function analyzers employ mechanical scanning systems such as precise scanning of a razor edge or precise rotation of a drum containing a precision machined slot. These systems use mechanical scanning to control which element of the image controls the output of a photosensitive electrical output device, usually a photomultiplier tube - the output of the tube being representative of the light intensity at the selected image element. These systems have problems in that mechanical scanning systems do not provide completely reproducible scans. This prevents the use of repetitive scans to improve the signal to noise ratio of the values of E by integration (averaging) of the results for different scans. The accuracy of those systems which produce analog output plots is further deteriorated by the necessity of manually assigning digital values to the analog output plots in order to digitally calculate the optical transfer function of the system under test. Errors can arise during the assigning of values or in keypunching these values for delivery to a digital computer for calculation of the optical transfer function.

Further, since the calculations are not performed on line, more data than is necessary for simple pass/fail tests must be measured and the optical systems under test must be accurately identified with the resulting output plots in order to prevent the final data values from being credited to the wrong optical system.

OBJECTS

A primary object of the invention is to provide an all electronic optical transfer function analyzer.

Another object of the invention is to provide an optical transfer function analyzer in which mechanical scanning is eliminated.

Another object is to provide an optical transfer function analyzer which provides all the data necessary to calculate both the modulation transfer function and the phase transfer function for any optical system having real images.

Another object is to provide an inexpensive optical transfer function analyzer.

Another object is to eliminate the requirement for precision machining the parts for an optical transfer function analyzer.

Another object is to eliminate the problems and inaccuracies of prior art optical transfer function analyzers.

SUMMARY OF THE INVENTION

The invention achieves the above objects by providing all electronic image dissection means in order to electronically control what portion of an image transmitted by an optical system under test contributes to the output of the system. So providing eliminates the inaccuracies of even precision mechanical scanning systems. The output from the image dissection means is preferably electronically digitized for easy and accurate storage of data and calculation of the transfer function being measured. A digital processor calculates the desired transfer function on line while the measurements are being made. Pass/fail tests can be terminated as soon as sufficient data has been obtained to allow calculation of the values necessary to determine the results of the test.

The image dissection means is preferably an image dissector tube having its focusing coils driven by the output of digital-to-analog converters controlled by a digital computer. The analog beam intensity output signal from the image dissector is preferably converted to digital values by an analog-to-digital converter whose output is provided to the same digital computer for storage and on line calculation of data values. The use of electronic image dissection and on line computation of values allows multiple scans of the same data to reduce the signal to noise ratio to a desired level without excess data being collected.

DESCRIPTION

In order to measure the optical transfer function of an optical system, it is preferred, in accordance with the invention, to pass a collimated light beam of small cross-sectional area through the optical system under test. The real image of the light source which is produced by the optical system under test is focused on an image surface of an analyzing system. According to the invention, the image surface is one which allows accurate all electronic dissection of the image, both as to the area selected for output and as to the beam intensity in the selected area. The beam intensity in a selected area is converted to an electrical signal representative of that intensity. The electric signal is then processed to provide the desired measurement values. The optical transfer function is determined from measurements of the beam intensity on the image surface outside the image of the beam source. The light outside this part of the image results from distortion, diffraction and defects in the optical system under test.

BRIEF DESCRIPTION OF THE DRAWINGS

FIG. 1 is a block diagram of the preferred embodiment of the invention, shown in partial perspective for increased clarity in describing the invention.

FIG. 2 is a block diagram of a preferred implementation of the image dissection means of FIG. 1.

DETAILED DESCRIPTION OF THE INVENTION

Apparatus

In FIG. 1 the beam source 10 provides a beam 12 which is to be passed through the optical system under test in order to produce an image at the image surface 32 of an image dissection means 30. The optical system under test 24 must be appropriate to the test beam and in the case of a test light beam may comprise any optical elements, including, but not limited to lenses, mirrors, filters, prisms, etc. Beam 12 passes through a collimator 14 which eliminates any divergent or convergent light rays or particles from the beam 12 to provide a fully collimated beam 16. Naturally if the source is self-collimating as is the case with a laser light beam, the collimator 14 may be eliminated from the system. Source 10 and collimator 14 together comprise a source of a collimated beam 16. Collimated beam 16 strikes a test beam limiting means shown as an opaque mask 18 which blocks all of the beam except that which passes through a small cross section opening 20 in the mask 18. The small cross section opening 20 is hereinafter referred to as slit 20, although such reference is not to be construed as limiting the shape of opening. A reduced cross section test beam 22 emerges from slit 20. Source 10, collimator 14, mask 18 and slit 20 together comprise a test beam source means. The test beam 22 may take any form desired, including test patterns created by illuminating test patterns such as grid lines, etc. However, the collimated beam passed through a slit is preferred. Test beam 22 enters the optical system under test 24 and emerges as data beam 26 whose characteristics depend on the transfer function of the optical system under test. While the position of beam 22 on the optical system under test is adjustable to illuminate any desired portion of the system, the position, once selected, is maintained until all of the data required for computation of the optical transfer function is obtained. For this reason, beams 22 and 26 are properly described as "spatially fixed."

Data beam 26 directly strikes an image surface 32 of an electronic image dissection means 30. The term "directly strikes" means that there is no optical modification of test beam 26 before it reaches surface 32. In other words, no impediment such as a mask or slit is interposed between the optical system under test and surface 32.

Preferably, means 30 is a conventional image dissector tube having positioning coils (not shown) responsive to an address signal for selecting which elemental area of the image surface determines the output signal of the tube. The amplitude of the output signal is a measure of the intensity of light incident on the selected elemental area.

Image surface 32 is preferably planar and circular, however, it may be made curved or of whatever shape is desired in accordance with the characteristics of system 24 which is to be tested, or in accordance with the requirements of image dissection means 30.

The element of the image which is selected for measurement or sensing is controlled by a control means 34 through cable 36. The output signal representative of the beam intensity is fed to control means 34 through cable 38. The necessary calculations are preferably carried out on line by control means 34 which may be a general purpose of minicomputer or a special purpose computer. The desired output values are transmitted to output means 40 through cable 42. Output means 40 may comprise a display system, a process control system, storage means or may be any other appropriate device.

It is preferred to have control means 34 completely program controlled to eliminate the need for human intervention during testing. Among the modes in which the system should be operable for maximum efficiency are single scan, multiple scan with averaging of all the output values for each element of the image surface over all the scans and an assembly line test mode in which the controller provides accept/reject commands in accordance with the data values measured and test standards with which it is provided. For performing pass/fail or accept/reject tests the control means 34 includes a comparison means for comparing the test values with the test standards or limiting values.

If it is desired to evaluate the optical system under test for varying locations of slit 20, control means 34 may also control the positioning of mask 18 through cable 44 and a mechanical drive means illustrated as an $x$ drive motor, gear and rack 46 and a $y$ drive motor, gear and rack 48. If desired, this system can be constructed to translate the entire test beam source means (10, 14 and 18) rather than just mask 18.

The preferred implementation of image dissection means 30 is an image dissector tube 50 as shown in FIG. 2. The $x$ and $y$ axis positioning coils of the image dissector tube constitute an image element addressing means responsive to electrical control signals for selecting the image element which controls the output signal.

For use with the image dissector tube 50, control means 34 can be broken down into subsystems. One such subsystem is an addressing signal generating means comprising digital-to-analog converter means 52 and 54 for converting digital image element addresses from a processor 56 to the analog signals necessary for controlling the image element addressing means (the x and y axis positioning coils) of the image dissector 50. The positioning coils focus the photoelectrons from the selected element on the dissector aperture of the tube to provide an output signal from the electron multiplier section of the tube which is representative of the beam intensity at the selected element.

The analog output signal preferably drives analog-to-digital converter means 58 for converting the image dissector output signal from an analog amplitude to a digital value in a form suitable for processing by processor 56. The remainder of the system preferably remains as in FIG. 1.

In even the best image dissector tubes there are variations in the response of the photocathode to a given incident light intensity from element to element. For those applications where this variation is sufficient to be harmful, the use of an on-line digital controller makes compensation for these variations possible. The photocathode variations can be determined by illuminating the entire photocathode with a constant intensity light beam of an intensity level expected during test measurements and then reading out the intensity of the response for each element of the photocathode and storing these values for future use in compensating for photocathode variations. If desired, these values may be obtained for several illumination intensities and may be stored in look up table fashion for determining the true illumination on each element during tests or may be used to calculate a correction factor. Where the response for a given element is abnormal by a fixed percentage for all relevant illumination levels, the errors which would otherwise be introduced by this abnormality are easily compensated by always multiplying the measured value for that element by a compensating factor stored in the processor.

Operation

In operation, the optical transfer function analyzer is both fast and accurate for obtaining the data necessary for calculating the optical transfer function of the optical system under test because no mechanical scanning is involved in determining the light intensities of the various elements within an image. This allows fast scanning of the image as well as repeated scans for a single slit position when integration of the light intensity is necessary to provide a useable signal-to-noise ratio.

To measure the optical transfer function of a test optical system, source 10 is energized and the collimated beam 16 is passed through slit 20 to limit the beam to a sharply defined small cross-sectional area at that point. The optical system under test 24, the image dissection means 30 and the beam source means comprised of elements 10, 14 and 18 are adjusted relative to each other until a real image of the source (slit 20) produced by test system 24 is focused on image surface 32 of image dissection means 30. Then an element on the image surface 32 is selected for intensity measurement and the image dissection means produces an electrical output signal representative of the beam intensity at the selected element. Thereafter, the selection process is repeated for other elements until each element of interest for the test or measurement has been selected. The elements are preferably scanned in order and if desired are scanned repeatedly and the intensity values of individual elements are averaged until the signal to noise ratio of the measurement is reduced to a desired level.

Once all the data for a given position of the beam source means has been obtained, the beam source means, may be moved to a new position so that the test beam 22 is incident on and passes through a different portion of the optical system under test. The data point selection and measurement process then continues as previously.

With an image dissection means which provides analog output signals, the output signals preferably drive an analog-to-digital converter to convert the analog intensity values to digital signals suitable for processing by a digital processor.

In production testing systems where there are defined standards which an optical system under test must meet, the processor preferably performs pass/fail tests which cause rejection of the optical system if it fails a specified set of one or more tests and approves the optical system if it successfully passes all tests or a specified set of one or more tests. The use of pass/fail tests reduces the amount of data required in each instance where the optical system is rejected prior to completion of a test sequence, since subsequent tests do not need to be performed. This also reduces the logistical problems of identifying a given optical system with its test results, since the test values are known when the optical system is removed from the test system.

In performing tests where the quality of the image a specified distance from the optical system under test is important, the step of focusing the image on the image surface may be replaced by establishing a predetermined distance between the optical system under test and the image surface and/or the test light source means.

Although an image dissector tube is the preferred implementation of image dissection means 30, an array of photosensitive semiconductor devices may be used as the image dissection means, as can other systems which meet the requirements given hereinbefore for image dissection means 30. It appears, at present, that production semiconductor arrays have not achieved the resolution obtainable from image dissector tubes. However, as better resolution is obtained, such arrays will become feasible for use in the inventive system even when high resolution is needed.

With semiconductor arrays, the addressing means comprises the decoding means needed for selecting the desired array element. The decoding means may be integrated into the array as desired and will usually serve to enable the output from the selected element.

While the preferred embodiment and some variations have been described, it will be understood by those skilled in the art that many changes may be made without departing from the spirit and scope of the invention.

I claim:

1. An analyzer for obtaining the optical transfer function of an optical system under test comprising:
   a. test beam source means for producing a collimated test beam incident on the optical system under test whereby the latter produces a data beam;
   b. an image dissector tube having an image surface for receiving the data beam, and positioning coils responsive to an address signal for selecting which elemental area of the image surface determines the output signal whose amplitude is a measure of the intensity of light received by the selected elemental area;
   c. address signal generating means for sequentially generating address signals that are applied to the positioning coils and are respectively associated with the various elemental areas of the image surface; and
   d. storage means responsive to the output signals of the tube and to the address signal generating means for storing numbers representative of the light intensity on the various elemental areas at locations correlated with the addresses thereof.

2. An analyzer according to claim 1 wherein the test beam source means produces a spatially fixed test beam and a spatially fixed data beam, and the image surface of the tube is positioned to directly receive the data beam.

3. The system of claim 2 further comprising:
   comparison means for performing pass/fail tests by comparing data for the optical system under test with limiting values.

4. The analyzer of claim 3 wherein the control means provides a reject signal when an optical system under test fails a test and provides an accept signal when an optical system under test has passed a specified set of test.

5. The analyzer of claim 2 wherein the test source means comprises:
   a beam source;
   collimator means for producing a collimated beam from the source;
   test beam limiting means for limiting the collimated beam to a smaller cross section test beam.

6. An analyzer according to claim 2 including means responsive to the contents of the storage means for computing the optical transfer function of the optical system under test.

7. An analyzer according to claim 2 wherein the address signal generating means includes means for generating digital address signals, and digital-to-analogue converter means for converting the digital address signals to analogue address signals that drive the positioning coils.

8. An analyzer according to claim 7 wherein the storage means includes an analogue-to-digital converter for converting the output signals to digital signals that represent the light intensities of the various elemental areas.

9. A method of obtaining data on the characteristics of an optical system under test comprising the steps of:
   a. passing a collimated, spatially fixed test beam through the optical system under test;
   b. focusing the beam emerging from the optical system under test directly onto the image surface of an image dissector tube;
   c. selecting an elemental area of the image surface for sensing;
   d. generating an address signal designating the address of the selected elemental area;
   e. storing the resultant output signal of the tube at a location correlated with the address of the selected elemental area; and
   f. repeating steps (c), (d) and (e) for different elemental areas until all of the desired elemental areas have been selected at least once.

10. A method according to claim 9 including repeating step (f) a plurality of times to enable an average value of the output signal for each elemental area to be computed thus improving the signal-to-noise ratio of the data being obtained.

11. An analyzer for obtaining the optical transfer function of an optical system under test comprising:
   a. test beam source means for producing a collimated test beam incident on the optical system under test whereby the latter produces a data beam;
   b. an image dissector tube having an image surface on which the data beam forms a two-dimensional brightness distribution covering a predetermined region thereof, and positioning coils responsive to an address signal for selecting which elemental area of the image surface determines the output signal whose amplitude is a measure of the intensity of light received by the selected elemental area;
   c. address signal generating means for sequentially generating address signals that are applied to the positioning coils and are respectively associated with elemental areas of said predetermined region of the image surface; and
   d. storage means responsive to the output signals of the tube and to the address signal generating means for storing numbers representative of the light intensity on the various elemental areas at locations correlated with the addresses thereof.

12. A method of obtaining data useful in computing the optical transfer function of an optical system under test comprising the steps of:
   a. passing a collimated test beam through the optical system under test;
   b. focusing the beam emerging from the optical system under test directly onto the image surface of an image dissector tube;
   c. selecting an elemental area of the image surface for sensing;
   d. generating an address signal designating the address of the selected elemental area;
   e. storing a representation of the resultant output signal of the tube at a location correlated with the address of the selected elemental area; and
   f. repeating steps (c), (d) and (e) for a two-dimensional array of elemental areas until all of such elemental areas have been selected at least once.

* * * * *